UNITED STATES PATENT OFFICE.

CHARLES C. HUGHES, OF AVONDALE, PENNSYLVANIA.

PREPARATION OF WHITEWASH FROM LIME.

SPECIFICATION forming part of Letters Patent No. 251,588, dated December 27, 1881.

Application filed April 7, 1881. (Specimens.)

*To all whom it may concern:*

Be it known that I, CHARLES C. HUGHES, a citizen of the United States, residing in Avondale, Chester county, Pennsylvania, have invented an Improvement in the Preparation of Whitewash from Lime, of which the following is a specification.

The object of my invention is to make a marketable product consisting of whitewash so prepared as to be free from the objectionable roughness and grit of ordinary whitewash—an object attained in the manner which I will now proceed to describe.

Whitewash made by slaking stone-lime with water in the usual way is objectionable on account of its roughness and grit, caused by the presence of insoluble granular particles in the lime of which the whitewash is made, and for this reason the use of whitewash is prevented in many cases where it would otherwise be preferable to the use of paint.

In carrying out my invention I first slake the stone-lime with water in the usual way, and then pass the product in its liquid state through an ordinary paint-mill, whereby the insoluble particles of the lime are reduced, and all traces of grit in the product eliminated. Whitewash so prepared, when applied to a smooth plastered wall or to a smooth board or other surface, produces a uniform coating closely resembling paint and entirely free from the usual spots, lumps, or streaks.

The slaked lime is preferably strained before grinding, so as to remove the dirt and foreign impurities therefrom.

In order to put the product into convenient shape for transportation or sale, I run the same, after the grinding operation, into tanks or vats, in which it is allowed to remain until a portion of the water is evaporated and the mass reduced to a pasty consistency of much less bulk than the liquid product. This pasty mass is then packed in cans, barrels, or other packages, and the latter are sealed to prevent the entrance of air.

I have found that the whitewash prepared and put up in this manner will not thicken or become hard with age, but will retain its pasty form and be ready for immediate application at any time on the addition of sufficient water to properly thin it.

I am aware that it has been proposed to grind oyster-shell lime to powder for use in the manufacture of mortar; but my invention is distinct from this process, as the object at which I am aiming will not be attained if the lime is ground before being slaked instead of afterward.

I claim as my invention—

1. The within-described method of making a smooth whitewash free from grit, said method consisting in mixing the lime with water, as usual, and then passing the liquid product through a grinding-mill, as set forth.

2. The within-described method of making whitewash and preparing the same for market, said mode consisting in mixing the lime with water, as usual, passing the liquid product through a grinding-mill, evaporating the product thus rendered smooth to the consistency of paste, and packing the mass in cans or other vessels, as specified.

In testimony whereof I have signed my name to this specification in the presence of two subscribing witnesses.

CHAS. C. HUGHES.

Witnesses:
JAMES F. TOBIN,
HARRY SMITH.